(12) United States Patent
Harris

(10) Patent No.: US 8,881,222 B2
(45) Date of Patent: Nov. 4, 2014

(54) MULTIMEDIA INTERACTIVE SIMULATOR

(75) Inventor: Stephen Harris, Alpharetta, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 457 days.

(21) Appl. No.: 12/564,985

(22) Filed: Sep. 23, 2009

(65) Prior Publication Data

US 2011/0069178 A1 Mar. 24, 2011

(51) Int. Cl.
*H04N 7/16* (2011.01)
*H04N 7/173* (2011.01)
*H04N 21/61* (2011.01)
*H04N 21/4143* (2011.01)
*H04N 21/432* (2011.01)
*H04N 21/414* (2011.01)
*H04N 21/433* (2011.01)
*H04N 21/422* (2011.01)

(52) U.S. Cl.
CPC .......... *H04N 7/165* (2013.01); *H04N 21/6125* (2013.01); *H04N 21/4143* (2013.01); *H04N 21/4325* (2013.01); *H04N 21/41415* (2013.01); *H04N 21/4331* (2013.01); *H04N 21/42204* (2013.01); *H04N 7/17318* (2013.01)
USPC ............... 725/141; 725/78; 725/86; 725/110; 725/153; 348/181

(58) Field of Classification Search
CPC .................... H04N 21/42219; H04N 21/4222
USPC ......... 725/78, 86, 110, 141, 131, 153, 90, 39, 725/50; 348/181, 734
See application file for complete search history.

(56) References Cited

U.S. PATENT DOCUMENTS

| | | | |
|---|---|---|---|
| 5,790,935 A * | 8/1998 | Payton | 725/91 |
| 5,909,638 A * | 6/1999 | Allen | 725/146 |
| 6,028,600 A * | 2/2000 | Rosin et al. | 715/718 |
| 6,536,041 B1 * | 3/2003 | Knudson et al. | 725/39 |
| 6,701,528 B1 * | 3/2004 | Arsenault et al. | 725/89 |
| 6,874,161 B1 * | 3/2005 | Wasserman et al. | 725/95 |
| 6,968,361 B2 * | 11/2005 | Okamura | 709/206 |
| 6,996,627 B1 * | 2/2006 | Carden | 709/237 |
| 7,020,892 B2 * | 3/2006 | Levesque et al. | 725/89 |
| 7,089,579 B1 * | 8/2006 | Mao et al. | 725/109 |
| 7,650,423 B2 * | 1/2010 | Carden | 709/237 |
| 7,757,251 B2 * | 7/2010 | Gonder et al. | 725/39 |
| 7,788,686 B1 * | 8/2010 | Andrews | 725/32 |
| 7,870,593 B2 * | 1/2011 | Stuckman et al. | 725/142 |
| 7,996,872 B2 * | 8/2011 | Levy et al. | 725/90 |
| 2002/0154157 A1 * | 10/2002 | Sherr et al. | 345/716 |
| 2003/0109994 A1 * | 6/2003 | Dubil et al. | 702/63 |
| 2003/0145338 A1 * | 7/2003 | Harrington | 725/136 |
| 2003/0149988 A1 * | 8/2003 | Ellis et al. | 725/87 |
| 2004/0073923 A1 * | 4/2004 | Wasserman | 725/46 |

(Continued)

OTHER PUBLICATIONS

Demand1, LLC; www.demand1.com; 2008; Denver, CO.

*Primary Examiner* — An Son P Huynh
(74) *Attorney, Agent, or Firm* — Guntin & Gust, PLC; Jay H. Anderson

(57) ABSTRACT

A system that incorporates teachings of the present disclosure may include, for example, a device, including a centralized controller to: distribute multimedia content to permit a television (TV) emulator client at one or more retail store locations to simulate a plurality of features of a television system interactively by using a media controller; and periodically update the multimedia content distributed to the TV emulator client. Other embodiments are disclosed.

20 Claims, 11 Drawing Sheets

(56) References Cited

U.S. PATENT DOCUMENTS

| | | | |
|---|---|---|---|
| 2004/0078817 A1* | 4/2004 | Horowitz et al. | 725/58 |
| 2004/0117831 A1* | 6/2004 | Ellis et al. | 725/53 |
| 2004/0194134 A1* | 9/2004 | Gunatilake et al. | 725/38 |
| 2005/0022237 A1* | 1/2005 | Nomura | 725/39 |
| 2005/0028208 A1* | 2/2005 | Ellis et al. | 725/58 |
| 2005/0081244 A1* | 4/2005 | Barrett et al. | 725/97 |
| 2005/0149981 A1* | 7/2005 | Augenbraun et al. | 725/112 |
| 2005/0262542 A1* | 11/2005 | DeWeese et al. | 725/106 |
| 2006/0053077 A1* | 3/2006 | Mourad et al. | 705/51 |
| 2006/0053451 A1* | 3/2006 | Lockrige et al. | 725/50 |
| 2007/0154163 A1* | 7/2007 | Cordray | 386/52 |
| 2007/0154169 A1* | 7/2007 | Cordray et al. | 386/83 |
| 2007/0157266 A1* | 7/2007 | Ellis et al. | 725/89 |
| 2007/0157281 A1* | 7/2007 | Ellis et al. | 725/134 |
| 2007/0192812 A1* | 8/2007 | Pickens et al. | 725/94 |
| 2007/0240193 A1* | 10/2007 | Sie et al. | 725/88 |
| 2007/0244750 A1* | 10/2007 | Grannan et al. | 705/14 |
| 2007/0248165 A1* | 10/2007 | Boyce et al. | 375/240.02 |
| 2008/0055487 A1* | 3/2008 | Chang | 348/726 |
| 2008/0064490 A1* | 3/2008 | Ellis | 463/25 |
| 2008/0092173 A1* | 4/2008 | Shannon et al. | 725/47 |
| 2008/0192839 A1* | 8/2008 | Gahm et al. | 375/240.26 |
| 2008/0209491 A1* | 8/2008 | Hasek | 725/114 |
| 2008/0244658 A1* | 10/2008 | Chen | 725/50 |
| 2008/0276279 A1* | 11/2008 | Gossweiler et al. | 725/46 |
| 2008/0307107 A1* | 12/2008 | Chen et al. | 709/231 |
| 2009/0037964 A1* | 2/2009 | Murray et al. | 725/92 |
| 2009/0133070 A1* | 5/2009 | Hamano et al. | 725/46 |
| 2009/0144765 A1* | 6/2009 | Branam | 725/1 |
| 2009/0172751 A1* | 7/2009 | Aldrey et al. | 725/87 |
| 2009/0187944 A1* | 7/2009 | White et al. | 725/46 |
| 2009/0198588 A1* | 8/2009 | White et al. | 705/26 |
| 2009/0222859 A1* | 9/2009 | Barsness et al. | 725/50 |
| 2010/0070902 A1* | 3/2010 | De Los Reyes et al. | 715/771 |
| 2010/0115559 A1* | 5/2010 | Ellis | 725/53 |

* cited by examiner

100

400

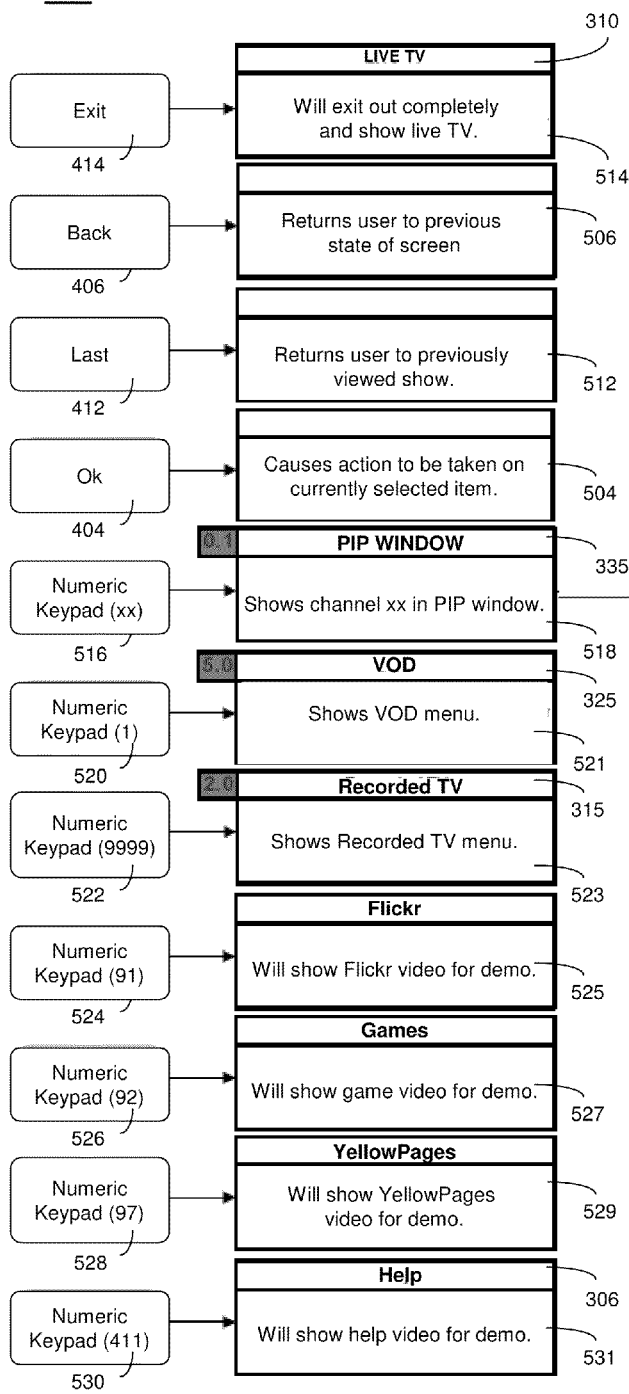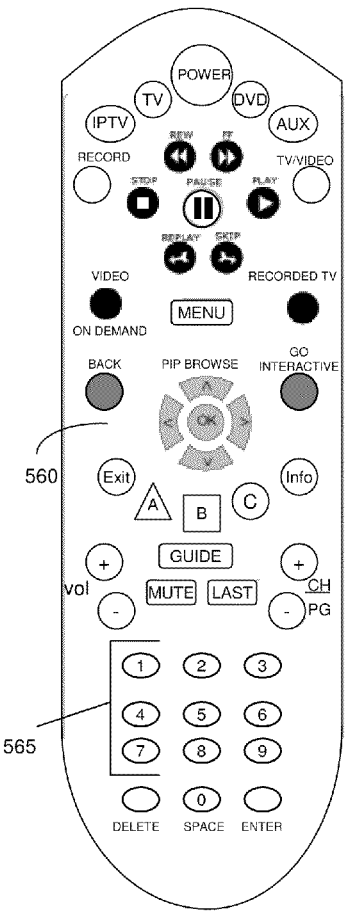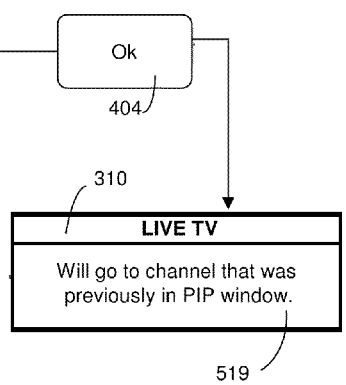

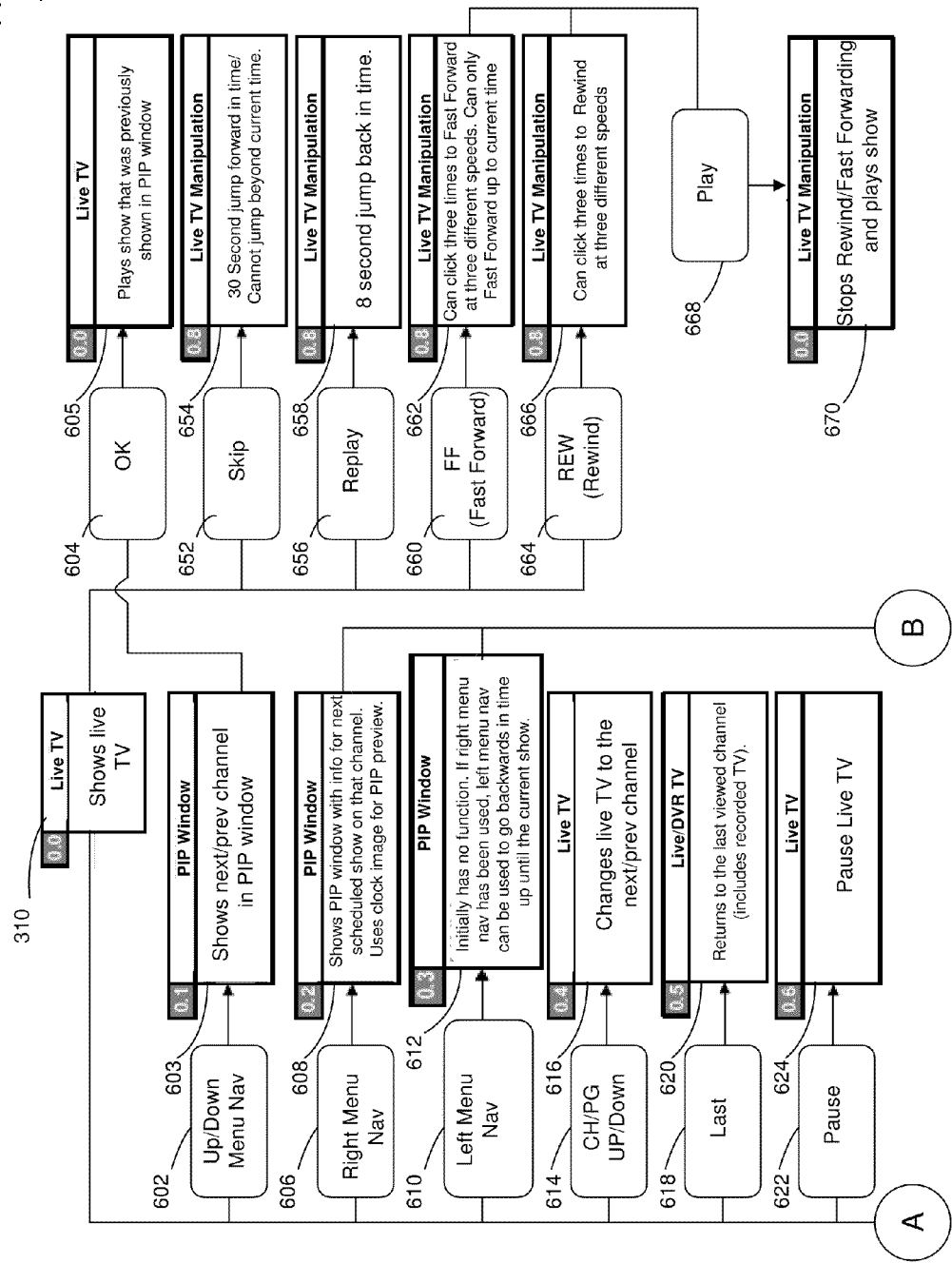

600

700

800

900

1000

1100

1200

MULTIMEDIA INTERACTIVE SIMULATOR

FIELD OF THE DISCLOSURE

The present disclosure relates generally to multimedia systems and more specifically to a multimedia interactive simulator.

BACKGROUND

With the growing popularity of multimedia systems, such as Internet Protocol Television (IPTV) broadcast media systems, the user/customer is becoming more familiar with such systems and thus more discriminating when evaluating and choosing a system for use in, for example, their home. Enhancing the customer's experience when evaluating, for example, an IPTV system increases the information available to the customer and thus serves to enable the customer to make better buying decisions and improves the overall satisfaction with the system the customer eventually chooses to purchase.

BRIEF DESCRIPTION OF THE DRAWINGS

FIG. 5 depicts an illustrative embodiment of the user interactions with the remote control of a multimedia interactive simulator 100 consistent with the present invention;

FIGS. 6A and 6B depict an illustrative embodiment of the user interactions with the remote control with respect to a live TV simulation;

DETAILED DESCRIPTION

One embodiment of the present disclosure can entail a method of simulating an Internet Protocol Television (IPTV) system, including: providing a television (TV) emulator client at one or more locations; receiving at the TV emulator client multimedia content from a centralized database to permit the TV emulator client to simulate a plurality of features of the IPTV system on a display; and using a remote control to interact with the TV emulator client.

Another embodiment of the present disclosure can entail a computer-readable storage medium, including computer instructions for instructing a multimedia interactive simulator to: provide from a centralized database a variety of multimedia content to permit one or more retail store locations to simulate a plurality of features of a television system interactively by using a remote control.

Yet another embodiment of the present disclosure can entail a device, including a centralized controller to: distribute multimedia content to permit a television (TV) emulator client at one or more retail store locations to simulate a plurality of features of a television system interactively by using a media controller; and periodically update the multimedia content distributed to the TV emulator client.

Figure 1:
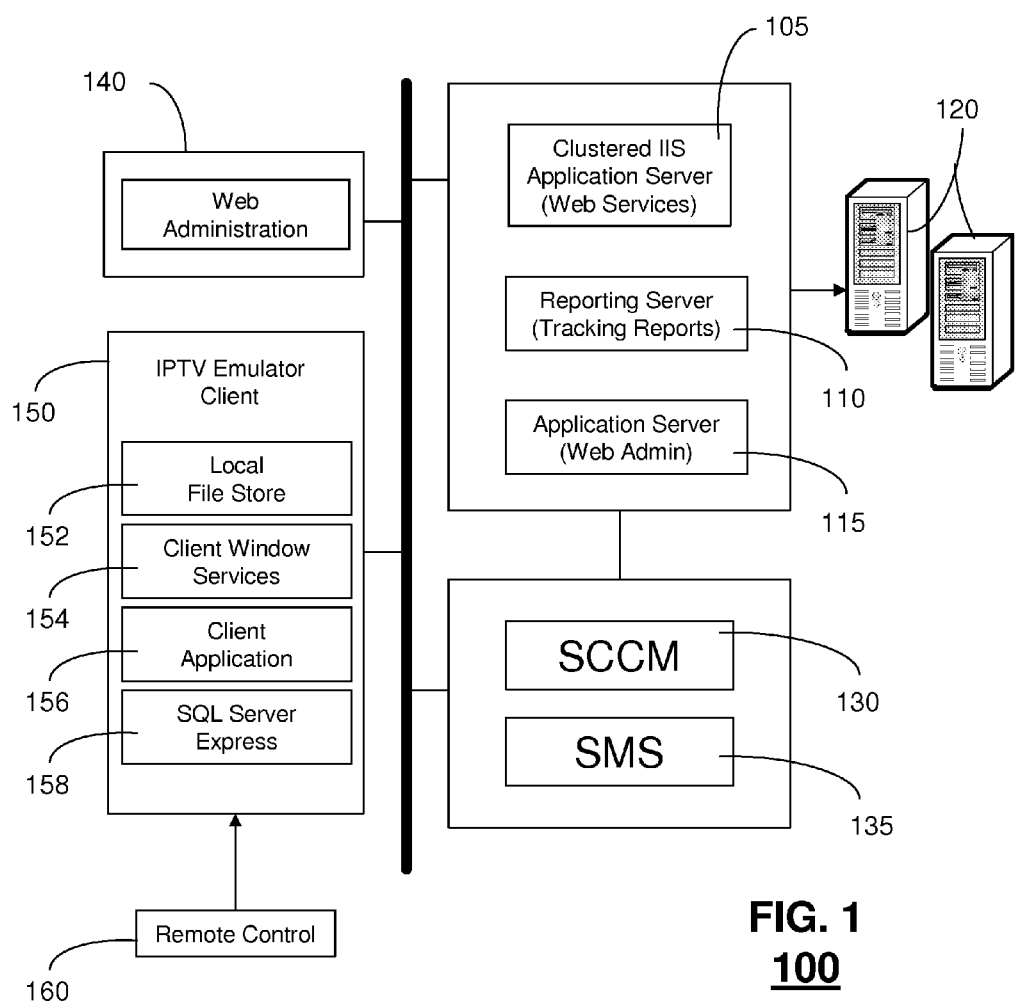
FIG. 1 depicts an illustrative embodiment of a multimedia interactive simulator 100 consistent with the present invention.

FIG. 1 depicts an illustrative embodiment of a multimedia interactive simulator 100 consistent with the present invention. In general, the multimedia interactive simulator 100 acts as a centralized control to enable thousands of retail stores to demonstrate the features of a TV system, such as but not limited to an IPTV system, interactively to prospective customers using a remote control. The multimedia interactive simulator 100 simulates or mimics an actual IPTV interface with recorded videos to provide retail store customers the experience without the need to connect to a live IPTV system. In this regard, it is not possible for many retail stores to connect to a live IPTV system. For example, in order to install the necessary video ready access device (VRAD) and hardware to provide a live IPTV feed, it can cost anywhere from $20,000-$80,000. This high cost of installation of a live IPTV system thus prevents many retail stores from connecting to a live IPTV system. Accordingly, without any live IPTV system, the sales or marketing associates are not able to demonstrate the capabilities of the IPTV system to a prospective customer, or to permit the customer to try and use the set-top box (STB) and experience the capabilities of the IPTV system.

The multimedia interactive simulator 100 includes but is not limited to the following elements. A clustered Internet information services (IIS) application server (web services) 105 provides services to replicate the database and any centralized real-time services. A reporting server (tracking server) 110 provides centralized reporting metrics. An application server (web administrator) 115 provides WEB access to maintain clients and content. The clustered IIS application server 105, reporting server 110 and application server 115 communicate with computing devices 120. Further, a system center configuration manager (SCCM) 130 monitors the retail store IPTV Client applications. A systems management server (SMS) 135 pushes large content to all store IPTV Client file share for local access. The SCCM 130 and the SMS 135 communicate with the servers 105, 110 and 115, and computing devices 120, and all together form the centralized control to enable thousands of retail stores to demonstrate the features of, for example, an IPTV system. A web administration 140 allows any browser on the network to access the administration for maintaining the content.

The Client or in-store side of the multimedia interactive simulator 100 may be, but is not limited to, a Personal Computer (PC) based interactive player that uses a media controller such as a standard remote control to control the demo. As shown in FIG. 1, the Client takes the form of an Emulator or demo Client 150. Although only one Emulator Client 150 is shown in FIG. 1, an Emulator Client 150 may be located at multiple retail store locations, for example, throughout the country. The Emulator Client 150 may include, but is not limited to, a local file store 152 which stores all large size video content files pushed by the SMS 135; a client window services 154 which pulls database changes on the server and replicates to a local structured query language (SQL) copy; a client application 156 which is the main IPTV simulation; and an SQL server express 158 which is the local content used by the IPTV client. A media controller such as remote control 160 is used, for example, by a customer in the retail store to control the IPTV simulation, as will be discussed in more detail below.

Figure 2:
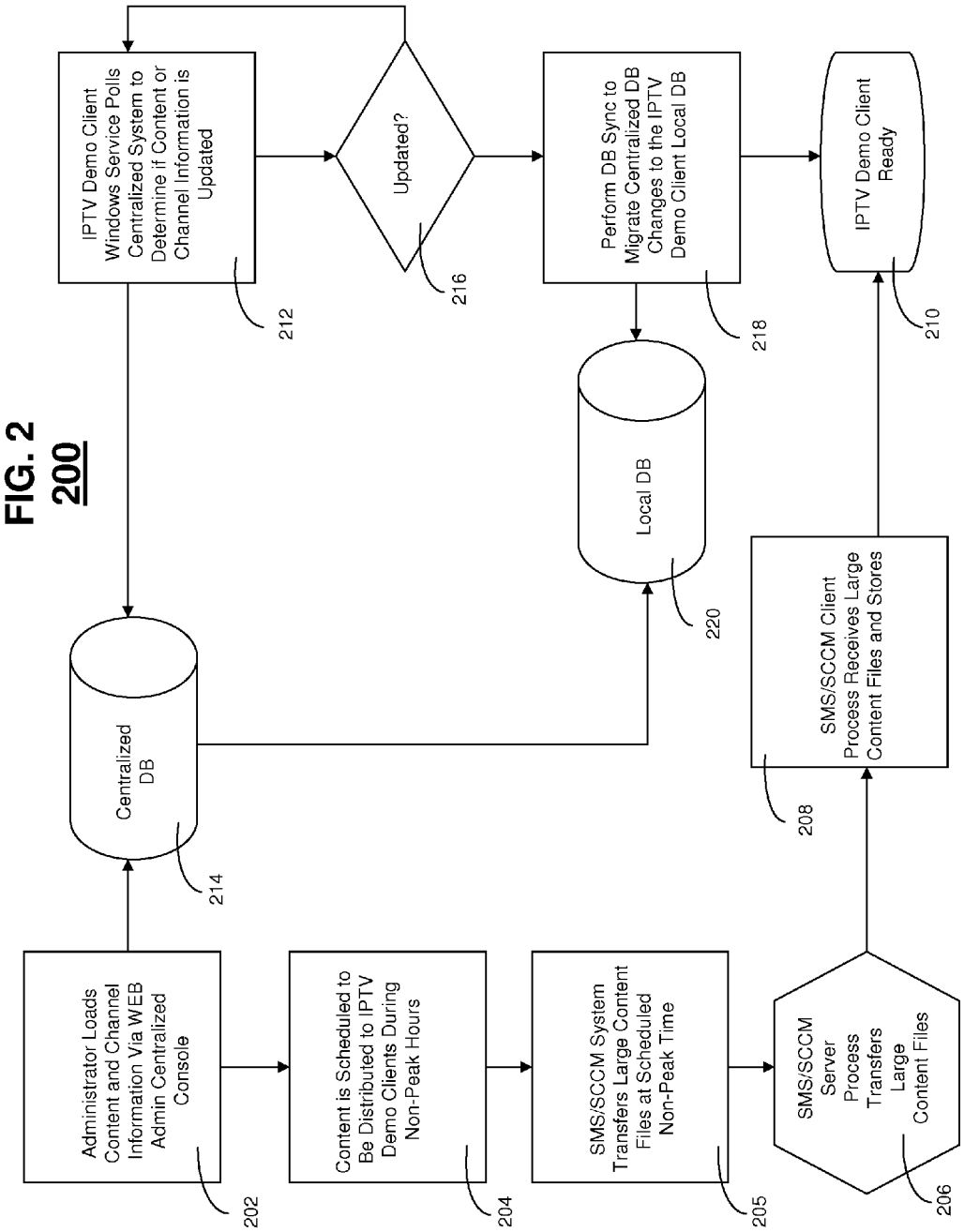
FIG. 2 depicts an illustrative embodiment of a method operating in portions of the multimedia interactive simulator 100 of FIG. 1.

FIG. 2 depicts an illustrative embodiment of a method operating in portions of the multimedia interactive simulator 100 of FIG. 1. Method 200 can begin with step 202 in which the administrator loads the content and channel information via a WEB administrator centralized console. In step 204, the content and channel information is scheduled to be delivered to the IPTV Emulator Client 150 during non-peak hours. In step 205, the SMS 130 and the SCCM 135 as a system transfers large content files at scheduled non-peak times. At step 206, the SMS/SCCM server process transfers large content files. In step 208, the local file store 152 receives the large content files and stores them such that they are available to the IPTV Emulator Client 150 at step 210. At the Emulator Client 150 side, in step 212 the client window services 154 polls the centralized database centralized system at 214 to determine if the content or the channel information is updated. At step 216, if the content/channel information is not yet updated, the client window services 154 will continue to check the centralized database at 214. On the other hand, if the content/channel information has been updated, a database synchronization to migrate centralized database changes to the Emulator Client 150 local database 220 is performed at step 218. The Emulator Client 150 is now ready to demonstrate the IPTV system via a simulation to the customer at any one of thousands of retail locations (see step 210).

A description of the interaction of the customer/user of the IPTV interactive demo or simulator will now be provided. It should be understood that the following description is exemplary and should not be taken as limiting. The IPTV interactive demo or simulator is a video demonstration of the IPTV that is loaded into the retail store's TV as, for example, a flash content. The demo videos are interactive with the customer/user using the remote control 160 using, for example, infrared (IR) or radio frequency (RF) signals sent to, for example, a universal serial bus (USB) attached to a PC located in a particular retail store. In this way, a customer/user has the opportunity to see what the actual IPTV will look like and be able to learn about the actual product even if the particular retail store does not have live IPTV. The IPTV interactive demo or simulator may include but is not limited to the following features in order to mimic or simulate the actual live IPTV: High-definition programming of entire loop; Fast channel change; Picture-in-picture (PIP) channel surfing; Go interactive; DVR functionality; Video-on-demand (VOD); Flickr-photo sharing; and Yellowpages.com.

Figure 3:
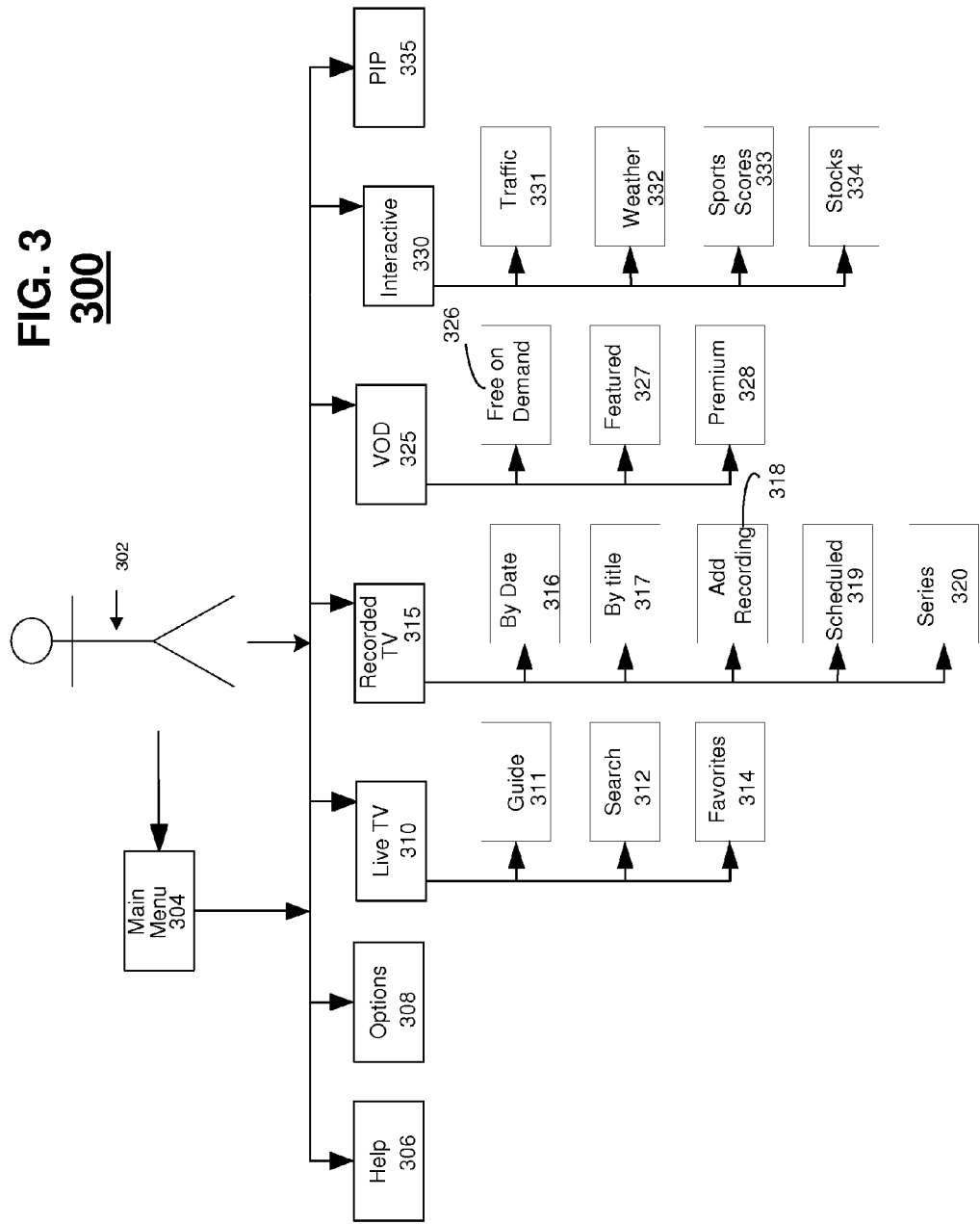
FIG. 3 depicts an illustrative embodiment of a system sequence flow of a multimedia interactive simulator 100 consistent with the present invention of FIGS. 1-2.
Figure 4:
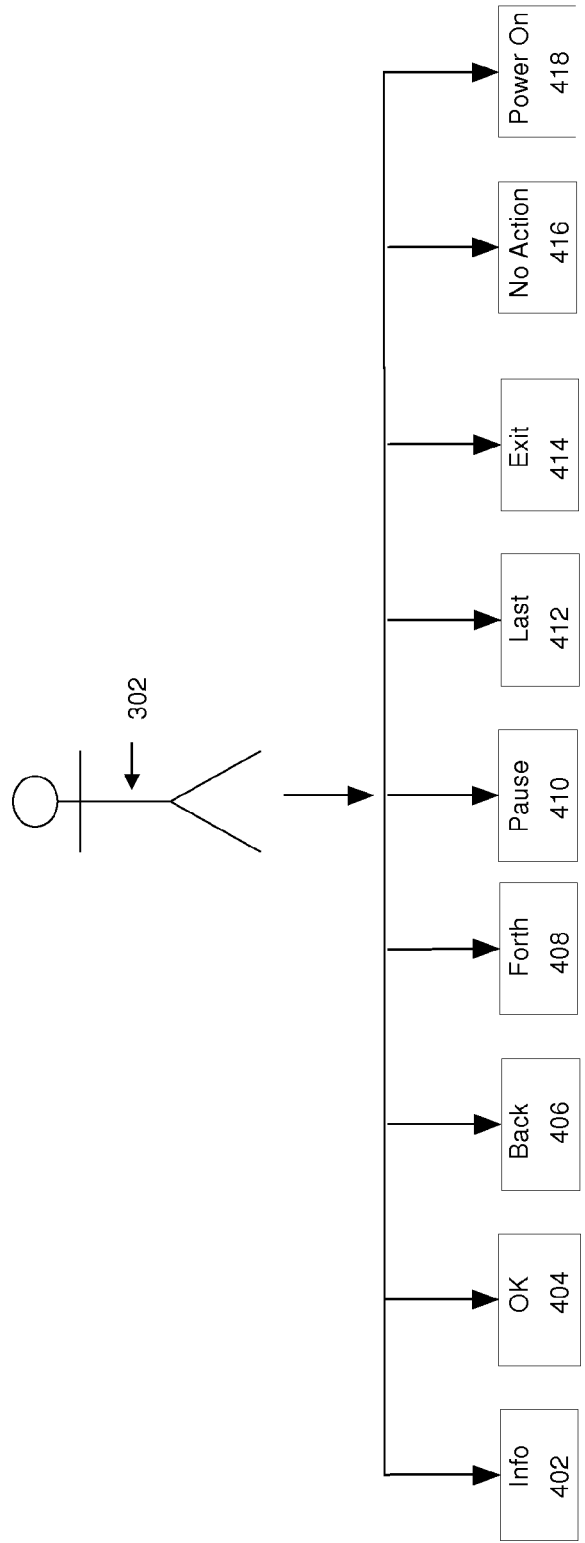
FIG. 4 depicts an illustrative embodiment of the basic operations of a user of a multimedia interactive simulator 100 via a remote control consistent with the present invention.

FIGS. 3 and 4 show a system sequence flow 300 of the multimedia interactive simulator 100 consistent with the present invention, as well as the basic operations 400 of a customer/user of a multimedia interactive simulator 100 via the remote control 160, respectively. In FIG. 3, the customer/user 302 can pull up a main menu 304 on the TV screen using the remote control 160. At the main menu 304, the customer/user 302 can pick from, for example, Help 306, Options 308, Live TV 310, Recorded TV 315, VOD 325, Interactive 330, and PIP 335. If Live TV 310 is chosen, the customer/user 302 may further choose Guide 311, Search 312, or Favorites 314. If Recorded TV is chosen, the customer/user 302 may further choose from: By Date 316, By Title 317, Add Recording 318, Scheduled 319, or Series 320. If VOD 325 is chosen, the customer/user 302 may choose from: Free on Demand 326, Featured 327, or Premium 328. If Interactive 330 is chosen, the customer/user 302 can choose from: Traffic 331, Weather 332, Sports Scores 333, or Stocks 334. As shown in FIG. 4, using the remote control 160, the customer/user 302 can choose from the basic operations of, for example, Info 402, OK 404, Back 406, Forth 408, Pause 410, Last 412, Exit 414, No Action 416, Power On 418, etc.

FIG. 5 depicts an illustrative embodiment of the user interactions 500 with the remote control of the multimedia interactive simulator 100 wherein the buttons have the same function throughout the system. In this case, the remote control 160 of FIG. 1 is shown in more detail as remote control 560. As shown in FIG. 5, pressing the Exit button 414 will exit out completely from the present state and show live TV 310 as shown at 514. Pressing the Back button 406 returns the user 302 to the previous state of the screen as shown at 506. Pressing the Last button 412 returns the user to the previously viewed show as at 512. Pressing the OK button 404 causes action to be taken on the currently selected item as at 504.

On the other hand, as shown in FIG. 5, pressing various combinations on the Numeric Keypad 565 have the following functions, although the particular numbers are meant as examples and may be set to any desired value. For example, pressing (channel (xx)-selected number) on the Numeric Keypad as at 516 shows the selected channel (xx) in PIP window 335 as at 518, and then pressing the OK button 404 will go to the channel (in Live TV 310) that was previously in the PIP window as at 519. Pressing (1) on the Numeric Keypad as at 520 shows the VOD menu 325 as at 521. Pressing (9999) on the Numeric Keypad as at 522 shows the Recorded TV menu 315 as at 523. Pressing (91) on the Numeric Keypad as at 524 will show the flickr video for demo as at 525. Pressing (92) on the Numeric Keypad as at 526 will show the game video for demo as at 527. Pressing (97) on the Numeric Keypad as at 528 will show the YellowPages video for demo as at 529. Pressing (411) on the Numeric Keypad as at 530 will show the Help video 306 for demo as at 531.

Figure 6B:
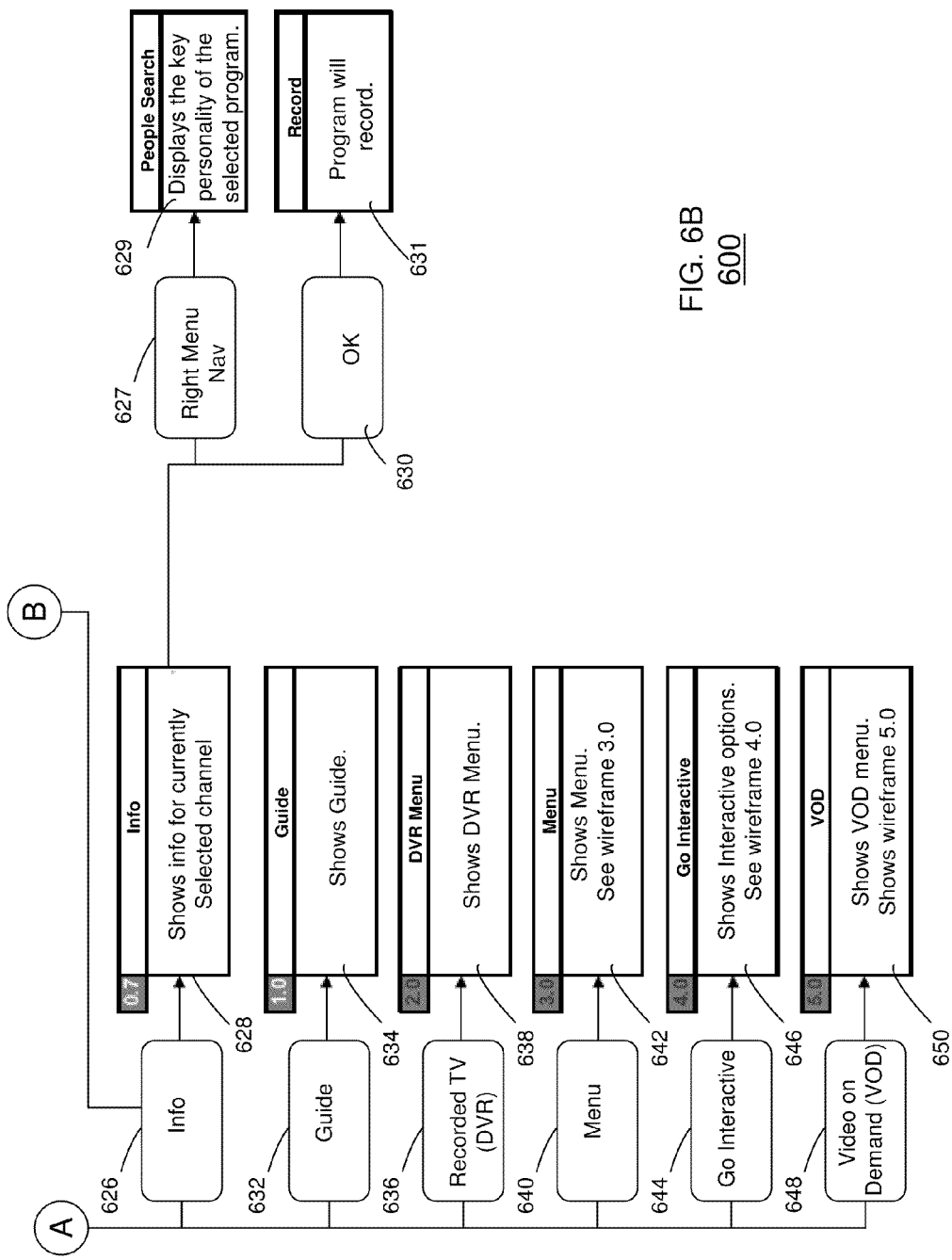

FIGS. 6A and 6B depict an illustrative embodiment of the customer/user 302 interactions 600 with the remote control 560 with respect to a live TV simulation. The actions shown in FIGS. 6A and 6B are exemplary of user actions that are initiated from watching Live TV 310. Pressing the Up/down menu navigation button 602 shows the next/previous channel in the PIP window as at 603, and further pressing the OK button 604 plays the show that was previously shown in the PIP window as at 605. Pressing the Right menu navigation button 606 shows the PIP window with information for the next scheduled show on that channel, and uses a clock image for the PIP preview as at 608. Pressing the Left menu navigation button 610 initially has no function; however, if the Right menu navigation button 606 has been used, the Left menu navigation button 610 can be used to go backwards in time up until the current show as at 612. Pressing the Channel/program Up/down button 614 changes live TV to the next/previous channel as at 616. Pressing the Last button 618 returns to the last viewed channel (includes recorded TV) as at 620. Pressing the Pause button 622 pauses live TV as at 624. Pressing the Information button 626 shows information for the currently selected channel as at 628, and further pressing the Right menu navigation button 627 displays the key personality of the selected program as a 629, whereas further pressing the OK button 630 will record the program as at 631. Pressing the Guide button 632 shows the Guide as at 634. Pressing the Recorded TV (DVR) button 636 shows the DVR menu as at 638. Pressing the Menu button 640 shows the Menu as at 642. Pressing the Go Interactive button 644 shows the interactive options as at 646. Pressing the video on demand (VOD) button 648 shows the VOD menu as at 650. Further, pressing the Skip button 652 performs a 30 second jump forward in time, but cannot jump beyond the current time as at 654. Pressing the Replay button 656 performs an eight second jump back in time as at 658. Pressing the Fast-forward button 660 allows fast forwarding at three different speeds, but can only fast-forward up to the current time as at 662. Pressing the Rewind button 664 allows rewinding at three different speeds as at 666. Also note that pressing the Play button 668 after either fast forwarding or rewinding stops the fast forwarding/rewinding and plays the show as at 670.

Figure 7:
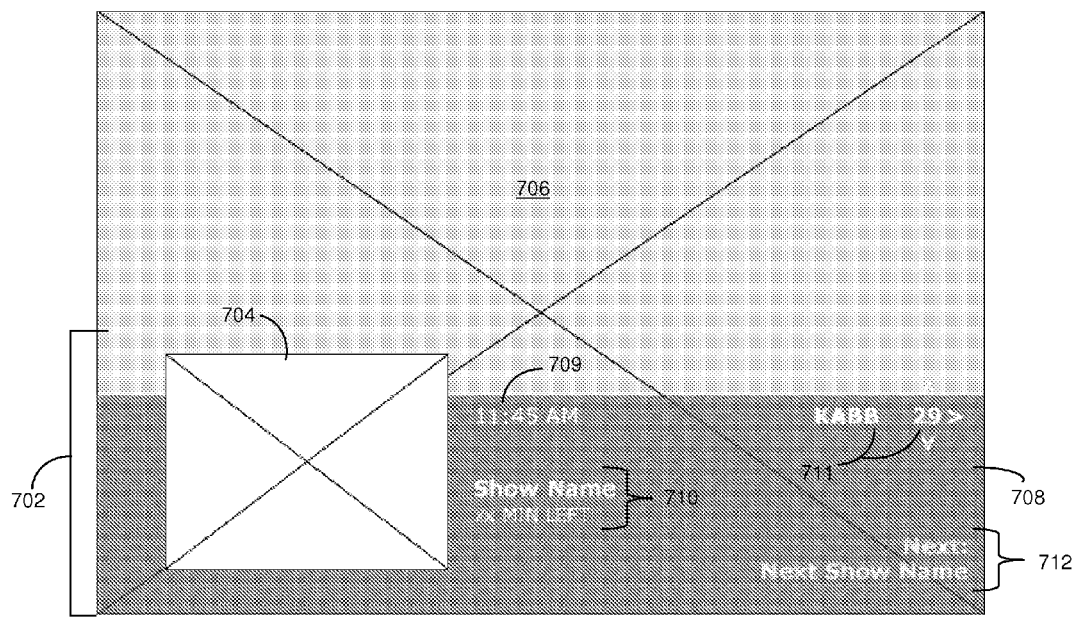
FIGS. 7-12 depict an illustrative example of a live TV simulation using the multimedia interactive simulator 100 consistent with the present invention.

FIGS. 7-12 depict an illustrative example of a live TV simulation using the multimedia interactive simulator 100 consistent with the present invention. FIG. 7 shows an example of a screenshot 700 of live TV including a PIP window. When live TV is being watched by a user on a display or TV screen 702 and the user 302 clicks the Up/down menu navigation button 602 on the remote control 560, the PIP window 704 is shown. The current TV show is fully visible in the background as at 706. The PIP bar 708 can be a translucent overlay. The PIP channel may be playing in the window 704. Moreover, the current time 709, the Show name and number of minutes left in the show 710, as well as the channel name and number 711, and the name of the next show 712 may all be shown in the PIP bar 708.

Figure 8:
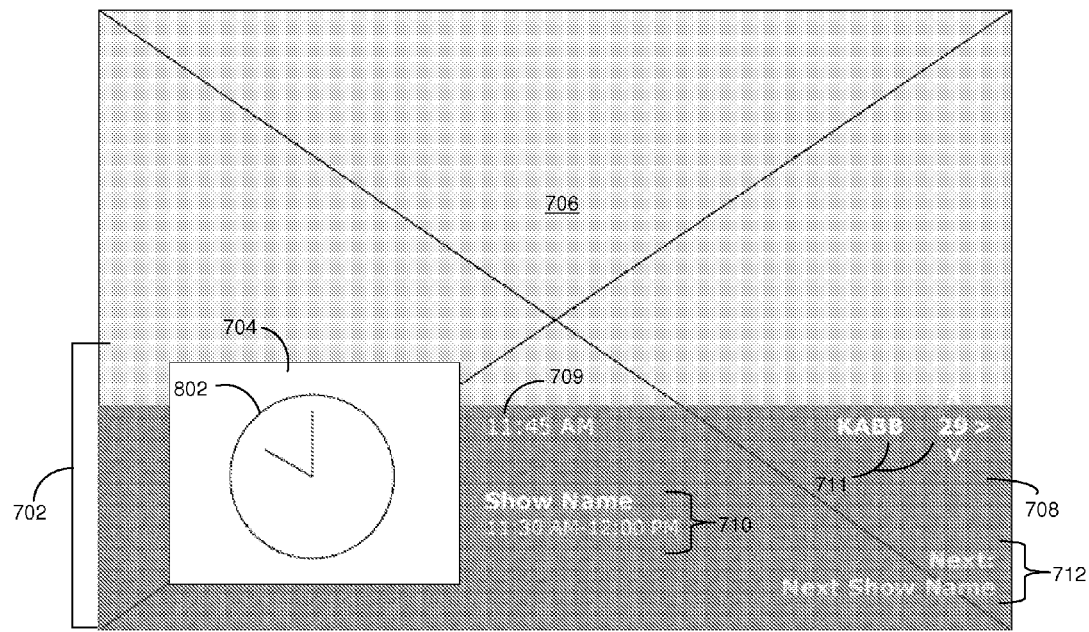

FIG. 8 is similar to FIG. 7 but shows the situation 800 when live TV is being watched in the user clicks the right menu navigation button 606 on the remote control 560. In this case, a static clock image 802 is shown in the PIP window 704, and instead of showing the number of minutes left, the start and end time of the show are shown at 710.

Figure 9:
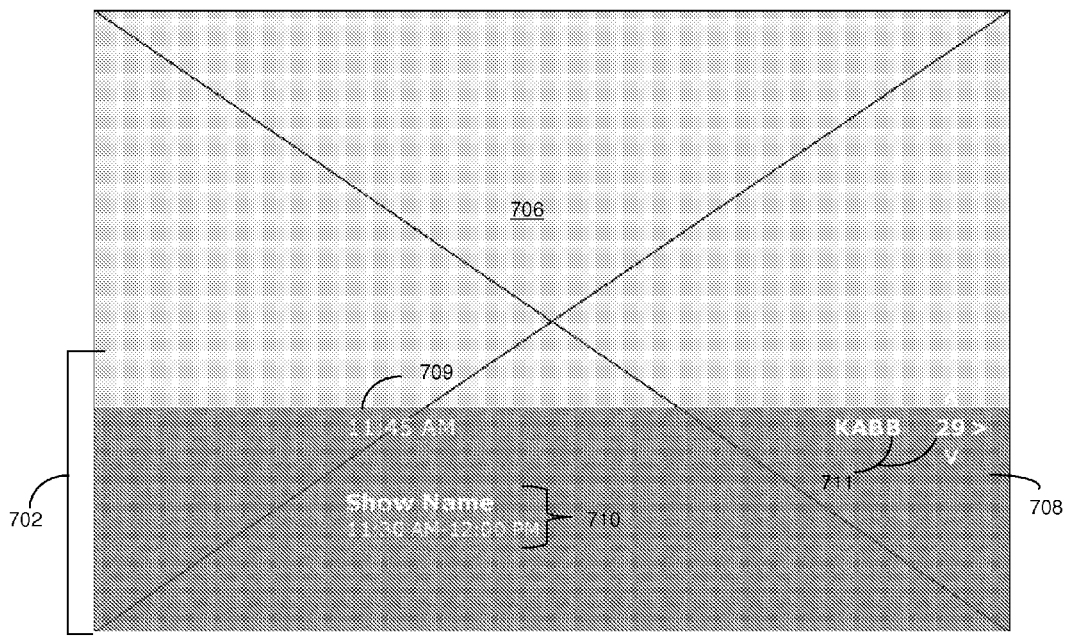

FIG. 9 is similar to FIGS. 7 and 8 but shows a channel change situation 900 where the user is watching live TV and the Channel/program up/down button 614 is pressed on the remote control 560. In this case, there is no PIP window visible.

Figure 10:
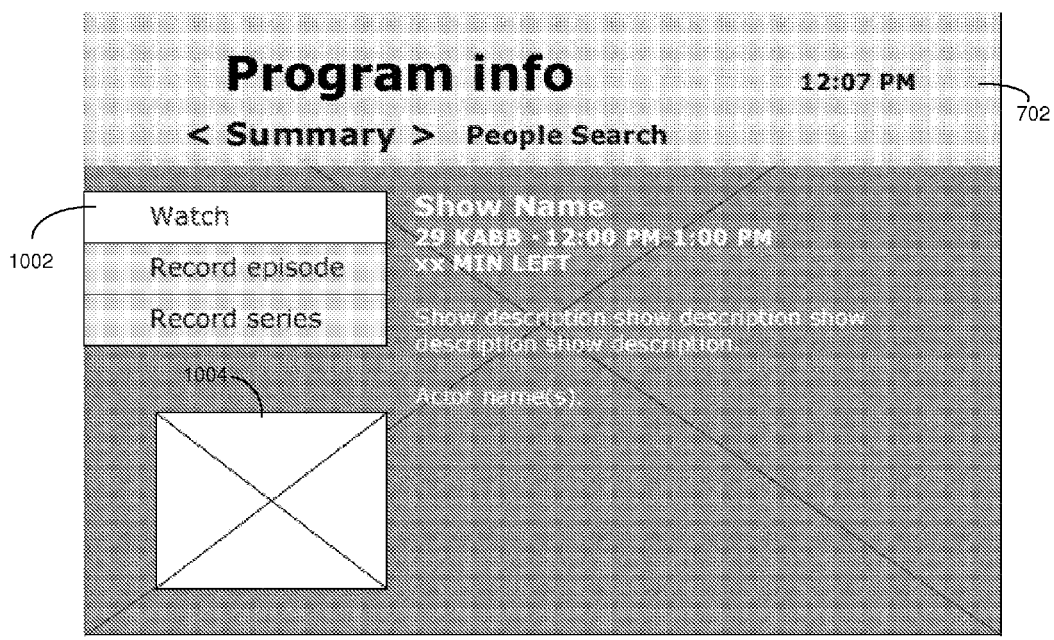

FIG. 10 shows an example of a Live Show 1000 where the information button 626 on the remote control 560 is pressed while the user is watching a live TV show. The option to watch the show is selected by default as at 1002, and the PIP window 1004 is shown for the show being described in the Program Information page.

Figure 11:
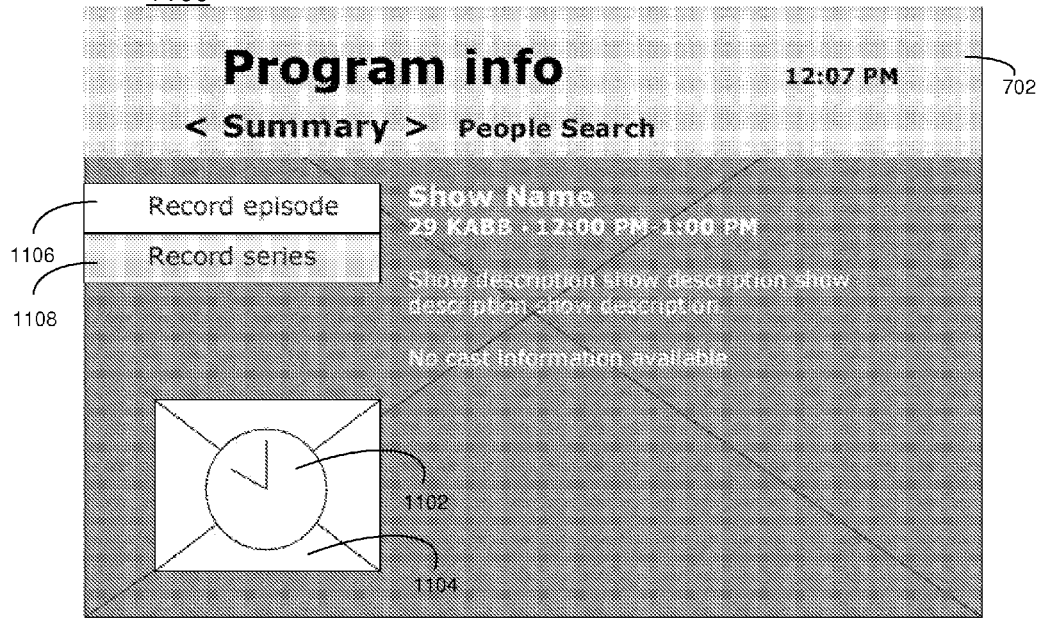

FIG. 11 shows an example of a Future show 1100 wherein if the Information button 626 is pressed while a future show is selected in the PIP window 1104, then a screen similar to that shown in FIG. 10 for live show is shown, except that the static clock image 1102 is shown, the number of minutes left in the show are not shown, and the "watch" option is not shown. In this example, the show is part of a series so that the option to record the episode 1106 or the series 1108 is available.

Figure 12:
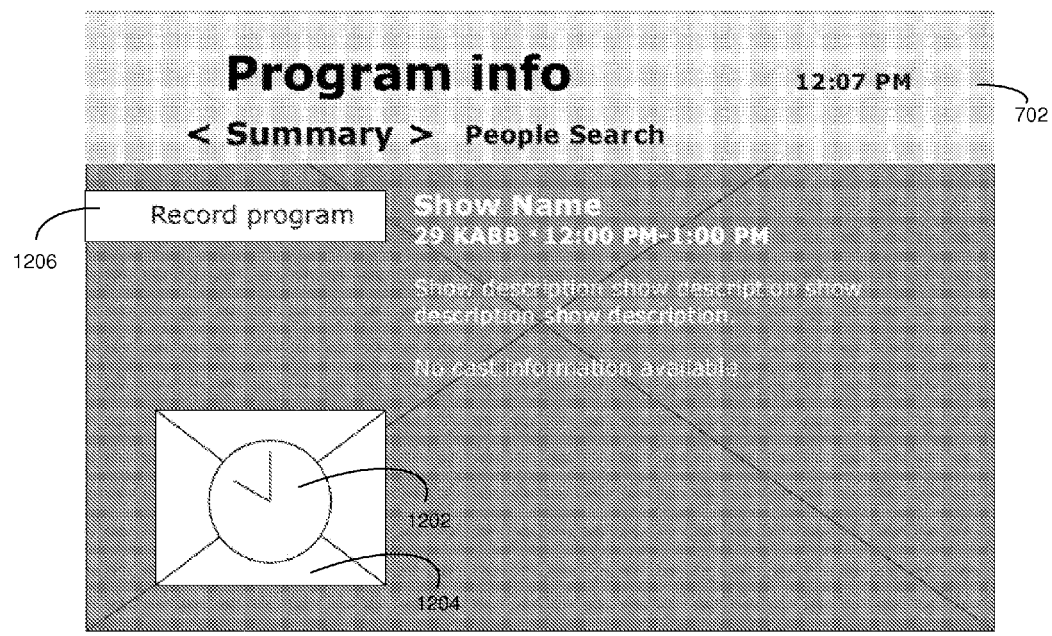

As a further example, FIG. 12 shows a Future show scenario wherein when the information button 626 is pressed while a future show is selected in the PIP window 1204. Again, the screen shown is similar to that shown in the Live TV: live show of FIG. 10, except that in this scenario, the show is not part of a series so the only option is to record the program itself as at 1206. Also, a static clock image is shown as at 1202.

The above description with respect to a Live TV scenario is intended to be exemplary in nature. The particular remote control functionality to operate Recorded TV 315, VOD 325, Interactive 330, etc., follows a similar process and therefore a detailed description thereof is dispensed with for the sake of brevity.

Moreover, as a whole, the multimedia interactive simulator 100 can run with or without Internet/intranet connection, and can support demos in multiple languages including but not limited to English and Spanish. The simulator 100 is designed such that there is no delay when switching channels in order to provide the user with a live IPTV experience. Moreover, the video demos provided for each channel may be presented in high definition, with each demo video running for 30-45 seconds as a loop. The video demos may be provided by the central administrator to the various retail stores.

The multimedia interactive simulator 100 consistent with the present invention, thus provides a much richer user experience at the point of sale in a given retail store by providing an element of entertainment, while at the same time showcasing the features and benefits of the IPTV system. This leads to an increase in customer satisfaction which in turn leads to a better in-store customer experience overall.

Upon reviewing the aforementioned embodiments, it would be evident to an artisan with ordinary skill in the art that said embodiments can be modified, reduced, or enhanced without departing from the scope and spirit of the claims described below. For example, an analog or digital broadcast distribution system such as cable TV system can be used in place of the IPTV media system described above. In this embodiment the cable TV system can provide Internet, telephony, and interactive media services. Moreover, it follows from the above illustrations that the present disclosure can apply to any present or future interactive over-the-air or land-line media content services.

Other suitable modifications can be applied to the present disclosure without departing from the scope of the claims below. Accordingly, the reader is directed to the claims section for a fuller understanding of the breadth and scope of the present disclosure.

Figure 13:
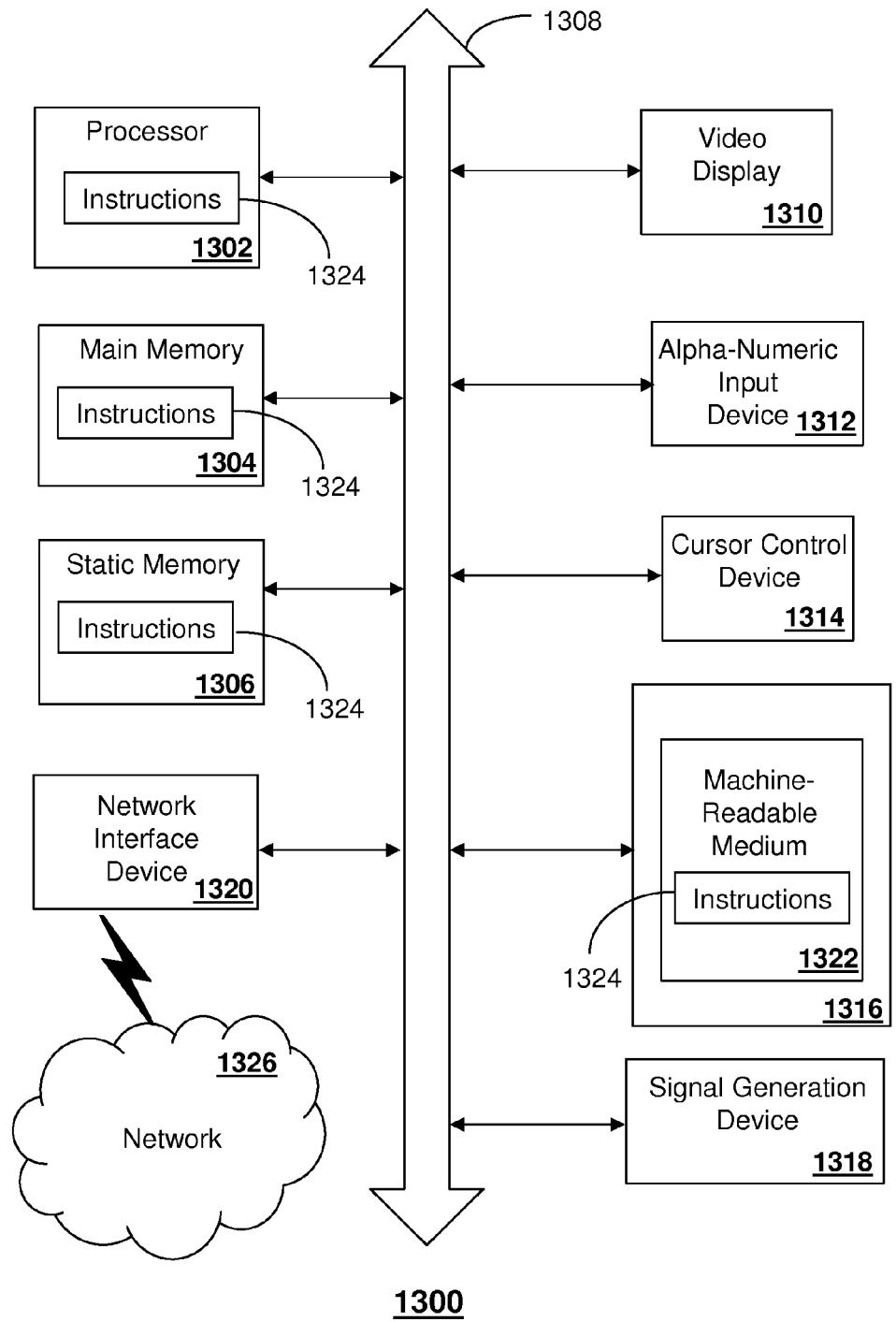
FIG. 13 is a diagrammatic representation of a machine in the form of a computer system within which a set of instructions, when executed, may cause the machine to perform any one or more of the methodologies discussed herein.

FIG. 13 depicts an exemplary diagrammatic representation of a machine in the form of a computer system 1300 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1300 may include a processor 1302 (e.g., a central processing unit (CPU), a graphics processing unit (GPU, or both), a main memory 1304 and a static memory 1306, which communicate with each other via a bus 1308. The computer system 1300 may further include a video display unit 1310 (e.g., a liquid crystal display (LCD), a flat panel, a solid state display, or a cathode ray tube (CRT)). The computer system 1300 may include an input device 1312 (e.g., a keyboard), a cursor control device 1314 (e.g., a mouse), a disk drive unit 1316, a signal generation device 1318 (e.g., a speaker or remote control) and a network interface device 1320.

The disk drive unit 1316 may include a machine-readable medium 1322 on which is stored one or more sets of instructions (e.g., software 1324) embodying any one or more of the methodologies or functions described herein, including those methods illustrated above. The instructions 1324 may also reside, completely or at least partially, within the main memory 1304, the static memory 1306, and/or within the processor 1302 during execution thereof by the computer system 1300. The main memory 1304 and the processor 1302 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1324, or that which receives and executes instructions 1324 from a propagated signal so that a device connected to a network environment 1326 can send or receive voice, video or data, and to communicate over the network 1326 using the instructions 1324. The instructions 1324 may further be transmitted or received over a network 1326 via the network interface device 1320.

While the machine-readable medium 1322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:

receiving, by a television emulator client executed by equipment of a retail store enterprise, multimedia content from a centralized database to permit the television emulator client to simulate a plurality of features of an interactive television system on a display as the television emulator client interacts with the multimedia content received from the centralized database without utilizing a connection to a broadcast television system, wherein the multimedia content comprises a plurality of media content representing different programs for different channels over a pre-determined time period, wherein the multimedia content is received from the centralized database during a non-peak traffic time period, wherein the centralized database is controlled by a content provider, wherein the equipment of the retail store enterprise is one of a group of equipment controlled by the retail store enterprise, wherein the group of equipment is located at different stores of the retail store enterprise, and wherein the retail store enterprise and the content provider are independently operated service providers;

storing, by the television emulator client executed by the equipment of the retail store enterprise, the multimedia content as a plurality of stored media content in a local database associated with the retail store enterprise;

receiving, by the television emulator client executed by the equipment of the retail store enterprise, control signals from a remote control to enable an interactive demonstration of the television system, wherein the interaction of the television emulator client with the stored media content is based on the control signals, and wherein the interaction includes simulating functions of the television system, the functions comprising a fast channel change performed by switching between different media content of the plurality of stored media content to represent the different programs for the different channels;

providing, automatically by the television emulator client executed by the equipment of the retail store enterprise, a polling request from the television emulator client to the centralized database regarding content updates;

responsive to the polling request and responsive to a determination that the content updates exist, receiving, by the television emulator client executed by the equipment of the retail store enterprise, update data at the television emulator client from the centralized database; and responsive to the receiving of the update data, performing, by the television emulator client executed by the equipment of the retail store enterprise, a synchronization based on the update data to migrate changes in the centralized database to the local database, wherein the update data includes programming updates and channel updates.

2. The method of claim 1, further comprising simulating picture-in-picture, interactive television, and video-on-demand functions.

3. The method of claim 2, wherein the television emulator client transmits the polling request to a centralized server that instructs the centralized database to provide the update data to the television emulator client.

4. The method of claim 2, wherein the simulating permits navigation of live television features using the remote control.

5. The method of claim 1, wherein the multimedia content comprises a plurality of video demos.

6. The method of claim 5, wherein each of the plurality of video demos runs for a predetermined period of time as a loop.

7. The method of claim 5, wherein each of the video demos is presented on the display, the display being located at a retail store location.

8. The method of claim 1, comprising storing the multimedia content at the local database, the local database being in communication with the television emulator client, wherein the synchronization is between the local database and the centralized database.

9. A non-transitory computer-readable storage medium, comprising executable instructions which, responsive to being executed by a processor having a multimedia interactive simulator, cause the processor to perform operations comprising:

determining a non-peak traffic time period; and providing multimedia content stored at a centralized database to equipment of a retail store enterprise located at a plurality of retail store locations during the non-peak traffic time period to permit the equipment of the retail store enterprise to simulate a plurality of features of an interactive television system on a display and thereby enable an interactive demonstration of the television system as the centralized database interacts with a television emulator client executed by the equipment of the retail store enterprise and as the television emulator client interacts with multimedia content received from the centralized database without utilizing a connection to a broadcast television system, the features comprising a fast channel change performed by switching between different multimedia content items from the centralized database, wherein the centralized database is controlled by a content provider, wherein the equipment of the retail store enterprise is one of a group of equipment controlled by the retail store enterprise, wherein the group of equipment is located at different stores of the retail store enterprise, and wherein the retail store enterprise and the content provider are independently operated service providers;

storing, by the television emulator client executed by the equipment of the retail store enterprise, the multimedia content as a plurality of stored media content in a local database associated with the retail store enterprise;

receiving a polling request automatically provided to the centralized database by the television emulator client executed by the equipment of the retail store enterprise regarding content updates; and responsive to the polling request and responsive to a determination that the content updates exist, transmitting update data to the television emulator client executed by the equipment of the retail store enterprise from the centralized database, wherein the transmitting of the update data causes the television emulator client executed by the equipment of the retail store enterprise to perform a synchronization at the television emulator client based on the update data to migrate changes in the centralized database to the local database in communication with the television emulator client, wherein the update data includes programming updates and channel updates.

10. The non-transitory computer-readable storage medium of claim 9, wherein in the fast channel change the multimedia content items represent different programs for different channels over a time period.

11. The non-transitory computer-readable storage medium of claim 10, wherein the multimedia content comprises a plurality of video demos, and wherein the time period is pre-determined.

12. The non-transitory computer-readable storage medium of claim 11, wherein each of the plurality of video demos runs for a predetermined period of time as a loop.

13. The non-transitory computer-readable storage medium of claim 9, wherein the providing of the multimedia content stored at the centralized database to the plurality of retail store locations during the non-peak traffic time period is responsive to user input at a web administrator computing device in communication with the centralized database.

14. The non-transitory computer-readable storage medium of claim 13, wherein the operations further comprise simulating picture-in-picture and video-on-demand functions, and wherein the synchronization includes replacing a portion of the multimedia content accessible to the television emulator client with updated multimedia content based on the content updates.

15. A device comprising a memory storing executable instructions and coupled to a centralized controller which, when executing the instructions, performs operations comprising:

determining a non-peak traffic time period;

distributing multimedia content stored at a centralized database to equipment of a retail store enterprise during the non-peak traffic time period to enable a television emulator client executed by the equipment of the retail store enterprise to simulate a plurality of features of an interactive television system on a display and thereby enable an interactive demonstration of the television system as the centralized controller interacts with the television emulator client executed by the equipment of the retail store enterprise and as the television emulator client interacts with multimedia content received interactively by using a media controller without utilizing a connection to a broadcast television system, the features comprising a fast channel change performed by switching between different multimedia content items from the centralized database, wherein the centralized database is controlled by a content provider, wherein the equipment of the retail store enterprise is one of a group of equipment controlled by the retail store enterprise, wherein the group of equipment is located at different stores of the retail store enterprise, wherein the retail store enterprise and the content provider are independently operated service providers, and wherein the television emulator client executed by the equipment of the retail store enterprise stores the multimedia content as a plurality of stored media content in a local database associated with the retail store enterprise;

receiving a polling request automatically provided to the centralized database by the television emulator client executed by the equipment of the retail store enterprise regarding content updates; and responsive to the polling request and responsive to a determination that the content updates exist, transmitting update data to the television emulator client executed by the equipment of the retail store enterprise from a centralized database, wherein the transmitting of the update data causes the television emulator client executed by the equipment of the retail store enterprise to perform a synchronization at the television emulator client based on the update data to migrate changes in the centralized database to the local database in communication with the television emulator client, wherein the update data includes programming updates and channel updates.

16. The device of claim 15, wherein the centralized controller comprises the centralized database, and the television emulator client comprises a personal computer based interactive player, and wherein in the fast channel change the multimedia content items represent different programs for different channels over a time period.

17. The device of claim 16, wherein the distributing of the multimedia content during the non-peak traffic time period is responsive to user input at a web administrator computing device in communication with the centralized database.

18. The device of claim 15, wherein the media controller comprises a remote control, and wherein the operations further comprise periodically providing the content updates for the multimedia content to the television emulator client.

19. The device of claim 15, wherein the multimedia content comprises a plurality of video demos.

20. The device of claim 15, wherein the multimedia content is distributed via an analog or digital broadcast distribution system.

\* \* \* \* \*